March 10, 1964   M. KAHN   3,124,639
LIGHT POLARIZING STRUCTURES
Filed Dec. 21, 1960

INVENTOR.
MYRON KAHN
BY Albert F. Kronman
ATTORNEY 3,124,639
LIGHT POLARIZING STRUCTURES
Myron Kahn, 15445 Ventura Blvd.,
Sherman Oaks, Calif.
Filed Dec. 21, 1960, Ser. No. 77,428
11 Claims. (Cl. 88—65)

This invention relates to light polarizing materials and specifically to materials capable of polarizing light incident thereon through refraction and reflection.

It is well known in the art that light incident upon a pile of plates of transparent material, such as glass, at angles of the order of 30° with respect to the normal will emerge from the plate as polarized light. Although this phenomenon has long been known, the structures are of little commercial importance because of the size and weight limitations inherent therein. It is also known that a light polarizer can be made using a multi-ply structure comprising in the neighborhood of 50 to 100 layers of thin transparent material such as cellulose acetate or the like. Such multi-ply structures require a large amount of material, and absorb substantial amounts of the light incident thereon. Still another light polarizing structure is formed of a large number of glass flakes disposed in parallel orientation and spaced from each other by air spaces so that light incident thereon will be reflected and refracted and emerge as polarized light. The glass flake structure, is difficult to manufacture in that it is not uniform throughout the area, has a substantial light absorbing thickness, and is expensive.

Accordingly, it is an object of the present invention to provide a light polarizing material capable of polarizing by reflection and refraction which will overcome the shortcomings of presently known devices. Another object of the present invention is to provide a light polarizing structure which will occupy a minimum amount of space within an illuminating device and which will be light in weight.

Still another object of the present invention is to provide a light polarizing structure which will be inexpensive to manufacture and can be incorporated into lighting fixtures and building panels without difficulty.

A further object of the present invention is to provide a light polarizing structure which will absorb sound and serve as an accoustical panel.

Still another object of the present invention is to provide a light polarizing structure which can be used in conjunction with fluorescent illuminating lamps.

A feature of the present invention is its use of a cellular plastic material having flat air spaces entrapped therein to produce the light polarizing effect.

Another feature of the present invention is its use of a frame-like supporting structure to give rigidity to the light polarizing material.

Still another feature of the present invention is its adaptability to the source of illumination in the form of screens slipped over the light source.

A feature of the present invention is its use of a protective coating over the cellular plastic material to prevent foreign matter from working into the structure.

A further feature of the present invention is its uniform appearance over a large area. A feature of the present invention is its ability to provide a low brightness effect in overhead illumination thereby eliminating the need for louvers or screens.

The invention consists of the construction, combination and arrangement of parts, as herein illustrated, described and claimed.

In the accompanying drawings, forming a part hereof is illustrated several embodiments of the invention, in which drawings similar reference characters designate corresponding parts and in which.

It is known in the plastic manufacturing art to fabricate foamed plastic structures by introducing air or gases into the plastic until a large number of foamy bubbles are entrapped within the structure. Such articles have been used for packaging, decorative purposes, manufacture of small articles for display purposes and the like. I have found that if foamed plastic, which is made of substantially light transparent plastic material, is extruded in the form of thin flat sheets, the bubbles within the cellular structure are flattened until the top and bottom of each of the said bubbles are substantially parallel, and lying in the plane of the sheet. Such a structure disposed in front of a light source will transmit polarized light and behave as a radial polarizer by reason of the fact that the incident light is refracted and reflected in its passage through the foamed plastic structure. The plastic which has an index of refraction of the order of 1.5 or more provides a sharply different index of refraction from the interior of the bubbles, which may be filled with gas or air. When the incident ray directed at an angle of between 30 and 50° with respect to the plane of the sheet traverses the various layers comprising the bubble walls and the air spaces therebetween the foamed plastic structure behaves in the manner of a pile of plates and causes the emerging rays to be polarized.

Figure 2:
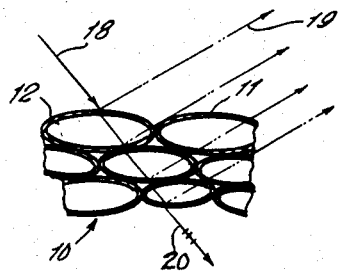
FIGURE 2 is a portion of the light polarizing structure shown in FIGURE 1 in cross section greatly enlarged over the showing of FIGURE 1, illustrating the path of a light ray through the cellular member.

Because of the high transparency of the plastic material which may be polystyrene, a cellulose ester, methyl methacrylate, or a suitable resin, a large amount of the incident light passes through the foamed plastic structure and emerges as polarized light. In addition, the cellular structure best shown in FIGURE 2 provides a large number of interfaces at which the rays are refracted or reflected so as to separate the polarized increment from the remainder of the light rays. The extremely thin walls of the bubbles comprising the cellular structure results in a minimum amount of light scatter and produces a highly efficient light polarizer. Since a large proportion of the cellular structure is air or an enclosure filled with gas, the material is light in weight, inexpensive, and absorbs very little of the incident light rays.

Figure 1:
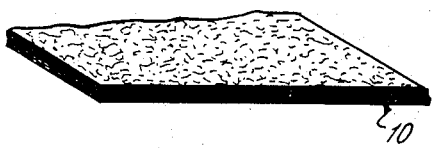
FIGURE 1 is a somewhat isometric fragmentary view in cross section of a light polarizing structure made in accordance with the present invention with the cellular structure shown greatly enlarged.

The foamed plastic material shown in FIGURE 1 is isotropic and does not exhibit interference phenomenon as a result of its manufacture.

Extremely thin films of the extruded foam structure such as polystyrene foamed film of the order of three to seven mils have been found to be excellent light polarizers for the purpose intended herein. Films up to 20 mils in thickness have been used but the thicker material tends to absorb a greater amount of incident light. It is therefore preferable to use sheets of material between 3 and 10 mils in thickness. It has also been found that by combining two or more layers of three mil thicknes material a more uniform form of product can be achieved in that the ability of the polarizer to hide the lamp or light source is greatly improved, since there is less likelihood of vertical alignment of the bubbles forming the cellular structure.

It will be apparent that foamed film structures of the type hereinabove described are extremely flexible and cannot support themselves in a manner which would make them suitable for installation as light polarizing panels.

Figure 3:
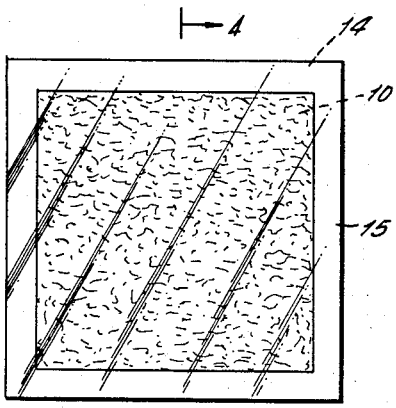
FIGURE 3 is a plain view of a light polarizing panel made in accordance with the present invention.

Accordingly, the assembly shown in FIGURE 3 has been devised to impart structural properties to the light polarizing film shown in FIGURE 1.

The panels shown in FIGURE 3 consist of a thin foil of light polarizing material 10 made of polystyrene foam or foamed plastic having a cellular structure and which has been extruded or formed into sheets in such a manner that the bubbles 11 of which the structure is formed have been flattened to entrap flat air filled spaces 12. The bubbles 11 are flattened in the same plane as that of the sheet 10 to provide substantially parallel top and bottom surfaces throughout the structure.

Since the foamed film 10 is cellular in nature, it cannot be laminated in the presence of heat and pressure without danger of flattening the structure to the elimination of the gas filled spaces 12. It is, therefore, necessary in forming a structure such as FIGURE 3 to protect the polarizing film 10 during the lamination process.

A successful panel may be made such as is shown in FIGURE 3 by taking a sheet of transparent isotropic plastic material or glass 13, placing a small frame 14 made of some suitable material such as a compatible plastic or glass, thereon laying the light polarizing film 10 within the frame 14, placing a second sheet 15 of glass or plastic over the frame 14 and thereafter laminating the structure together in the presence of heat and pressure. The frame 14 should be of a thickness at least as great as that of the light polarizing film 10. In this manner, the opposed sheets 13, 15 cannot be squeezed together to the damage of the light polarizing film 10. The lamination process will squeeze the air out from between the sheets 13, 15 and the surfaces of the polarizing film 10 without flattening the gas filled bubbles 11.

It is within the purview of the present invention to form the assembly shown in FIGURE 3 by means of transparent adhesives in lieu of lamination. In this form of the invention the polarizing sheet 10 can be held within the frame by securing the sheets 13 and 15 to the frame 14 by means of a suitable adhesive or plasticizer in accordance with techniques well known in the plastics art. It is also possible to coat the inner surfaces of the sheets 13, 15 with a transparent plastic which will not be a solvent for the foamed plastic film 10 in order to secure the film to the sheets 13, 15.

If desired, and in order to achieve certain sound absorbing advantages, the sheet 15 may be left off the assembly shown in FIGURE 3 and the light polarizing film 10 secured to the sheet 13 by means of an adhesive or some other suitable anchoring structure. The soft, sound absorbing, body of the polarizing film 10 can then be disposed beneath the ceiling of a room or in any other installation to absorb sound incident thereon. Since the material 10 is cellular and resilient it will act as an excellent sound absorber in addition to its light polarizing properties. The sheet 13 in such a structure imparts the rigidity necessary to support the light polarizing foamed structure 10 in any desired orientation.

It will be apparent, that the cellular structure of the light polarizing material 10 will also act as an insulator since the gas filled spaces 12 within the bubbles 11 are poor conductors. It will be evident that the structures shown in FIGURES 3 and 4 provides a light polarizing panel which will also be sound absorbent and insulating.

Figure 4:
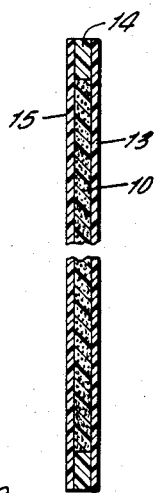
FIGURE 4 is a cross sectional view taken on line 4—4 in FIGURE 3.

In lieu of a single layer of foamed plastic material 10 as shown in FIGURE 4, two or more thin layers may be provided within the frame 14 to give a more uniform coverage throughout the panel. It will be apparent that vertical alignment of the bubbles 11 would increase the transparency of the polarizing film 10 without improving its light polarizing properties. In addition, the panel shown in FIGURES 3 and 4 should hide the light source such as a fluorescent lamp or an incandescent lamp from the eyes of a viewer and present a continuous luminous panel to the eye. By using a plurality of layers these objectives can be achieved.

Where the light polarizing foamed film 10 is used with an exposed surface it is desirable to employ a thin coating of some suitable light transparent plastic over the surface to give protection from foreign matter which might enter the spaces in the surface and render the panel unsightly. Any suitable resinous material which will adhere to the foamed plastic without damaging the surface thereof may be employed for this purpose. Where foamed polystyrene is used a transparent epoxy resin may be applied to seal the surfaces and add to the utility of the polarizing sheet 10. Other coatings will be readily apparent to those skilled in the art.

Where it is desired to use the light polarizing panel for indoor illumination the panel should be disposed so that its large surfaces and the gas filled bubbles are parallel with the floor. Glare will then be eliminated from tables, desks and all articles within the room. The result will be a most pleasing illumination and an increase in visual accuity. It is possible with the embodiment shown in FIGURES 3 and 4 to employ flame retardent materials such as vinyl plastic transparent sheets 13 and 15. Such panels, will overcome many of the objections heretofore had with respect to prior art devices which were highly flammable. The vinyl sheets 15 are preferably strain free and the type known as polished vinyl sheeting. This type of material provides the best laminated structure and lends itself to ready panel assemblying.

As a specific example of a highly efficient light polarizing sheet, a film of foamed polystyrene may be used in thicknesses of from three to fifteen mils. The polystyrene is formed with flat bubbles having a top to bottom thickness of from 0.5 to 1 mil and a length of from 1 mil to $\frac{1}{16}$th of an inch. Films of this nature will give a good diffusion effect when placed in front of a light source while at the same time yielding a high percentage of polarized light therethrough. While the walls of the individual bubbles will vary in thickness it is preferable to keep the wall thickness in excess of one micron.

Figure 5:
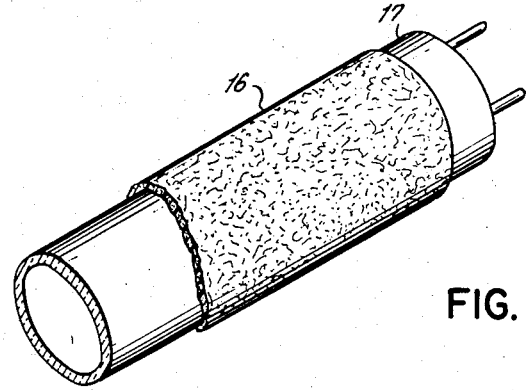
FIGURE 5 is a fragmentary view of a light polarizing screen member applied to a fluorescent lamp a further embodiment of the present invention.

Referring to FIGURE 5 there is shown a sleeve 16 made of the foamed plastic material hereinabove described. The sleeve may be disposed around a fluorescent lamp 17 with the result that light coming from the lamp will be directed through the sleeve 16 and emerge as polarized light. The reflected component of the light rays indicated at 19 in FIGURE 2 will be directed inwardly of the lamp 17 and eventually find its way back out through the light polarizing material.

In FIGURE 2 it will be seen that the beam 18 is broken up by the cellular structure of the polarizer 10 into the reflected component 19 and the transmitted component. The transmitted component 20 is polarized as indicated by the arrow emerging from the polarizing structure.

From the foregoing it will be seen that there has been provided light polarizing structures which are highly efficient and occupy a small amount of space within a panel. In addition, these structures are light in weight, adaptable to a large variety of light sources, and inexpensive. Polarizing films as disclosed herein can be made in any size and lend themselves to incorporation within a wide variety of transparent supporting structures. When used for indoor illumination and disposed in a plane parallel with the ceiling the area not immediately above a viewer will appear dark thereby giving the ceiling a low brightness effect which will relieve eye strain while at the same time maintaining the desired level of illumination throughout the room.

Having thus fully described the invention what is claimed as new and desired to be secured by Letters Patent of the United States, is:

1. A light polarizing structure comprising a mass of light transmitting foamed cellular plastic material, a plurality of substantially flat gas filled thin walled bubbles joined together at their contacting surfaces and randomly disposed to form a film, said bubbles being flattened in the same direction and parallel with the plane of the film, said plastic and gas having abruptly different indicies of refraction and a transparent rigid supporting member secured to at least one side of the film and overlying the said film.

2. A light polarizing structure according to claim 1 in which the plastic is foamed polystyrene.

3. A light polarizing structure according to claim 1 in which the bubbles have a top to bottom thickness of the order of from 0.5 to 1 mil and a length of from 1 mil to 1/16th inch.

4. A light polarizing structure comprising a plurality of thin films of light transmitting foamed cellular plastic material, disposed one upon the other, said films being formed of a plurality of substantially flat thin walled gas filled bubbles joined together at their contacting surfaces and randomly disposed within the films said bubbles being flattened in the same direction and parallel with the plane of the film, said plastic and gas having abruptly different indicies of refraction.

5. A light polarizing structure according to claim 1 in which the transparent supporting sheet is formed of a vinyl material.

6. A light polarizing structure comprising a mass of light transmitting foamed cellular plastic material, a plurality of substantially flat gas filled thin walled bubbles joined together at their contacting surfaces and randomly disposed to form a film said bubbles being flattened in the same direction and parallel with the plane of the film, said plastic and gas having abruptly different indicies of refraction and a transparent supporting member disposed upon each side of the film, overlying and extending beyond the edges of the film and secured together beyond the edges of the film to form a self supporting light polarizing structure.

7. A light polarizing structure according to claim 6 in which the supporting members are polished vinyl sheets.

8. A light polarizing structure comprising a mass of light transmitting foamed cellular plastic material, a plurality of substantially flat gas filled thin walled bubbles joined together at their contacting surfaces and to form a film said bubbles being flattened in the same direction and parallel with the plane of the film, said plastic and gas having abruptly different indicies of refraction and a transparent supporting member disposed upon each side of the film, overlying and extending beyond the edges of the film, a frame of transparent material around the edges of the film and between the supporting members said frame and supporting members being secured together beyond the edges of the film to form a self supporting light polarizing structure.

9. A structure according to claim 1 in which the bubble walls have a thickness not less than 1 micron.

10. A light polarizing structure comprising a light transmitting foamed cellular polystyrene plastic mass formed of a plurality of substantially flat gas filled thin walled bubbles joined together at their contacting surfaces and randomly disposed to form a film, said bubbles being flattened in the same direction and parallel with the plane of the film, said bubbles having a top to bottom thickness of the order of from 0.5 to 1 mil and a length of from 1 mil to 1/16the inch, said plastic and gas having abruptly different indicies of refraction.

11. A light polarizing structure according to claim 10 in which the film is at least 3 mils and not more than 20 mils thick.

References Cited in the file of this patent

UNITED STATES PATENTS

| | | |
|---|---|---|
| 2,340,476 | Keim | Feb. 1, 1944 |
| 2,402,176 | Marks | June 18, 1946 |
| 2,422,008 | Glassey | June 10, 1947 |
| 2,941,965 | Ingram | June 21, 1960 |
| 2,981,980 | Brown et al. | May 2, 1961 |
| 2,982,178 | Marks | May 2, 1961 |